United States Patent [19]
Perrins

[11] Patent Number: 4,733,117
[45] Date of Patent: Mar. 22, 1988

[54] RELUCTANCE SYNCHRO/RESOLVER

[75] Inventor: Allen R. Perrins, Branford, Conn.

[73] Assignee: The Superior Electric Company, Bristol, Conn.

[21] Appl. No.: 43,081

[22] Filed: Apr. 27, 1987

[51] Int. Cl.[4] .................. H02K 19/20; G05B 1/06
[52] U.S. Cl. .................... 310/162; 310/168; 310/165; 318/661; 318/685
[58] Field of Search ............ 310/162, 166, 168, 185, 310/195, 208; 318/661, 685

[56] References Cited

U.S. PATENT DOCUMENTS

| | | | |
|---|---|---|---|
| 4,375,636 | 3/1983 | Stack et al. | 318/661 |
| 4,458,168 | 7/1984 | Welburn | 310/185 |
| 4,551,708 | 11/1985 | Welburn | 318/661 |
| 4,568,865 | 2/1986 | Welburn | 318/661 |
| 4,625,158 | 11/1986 | Taenzer | 318/701 |

Primary Examiner—Patrick R. Salce
Assistant Examiner—D. L. Rebsch
Attorney, Agent, or Firm—McCormick, Paulding & Huber

[57] ABSTRACT

The pole members of each phase of a synchro have quadrifilar windings wherein each conductor is wound over six poles associated with a given phase. A voltage signal from an alternating current source is impressed across one conductor from each phase connected in series. The remaining conductors are connected to produce resolver-based $R\sin\theta$ and $R\cos\theta$ signals directly from the synchro without conversion from the normal three 120° out-of-phase signals.

1 Claim, 5 Drawing Figures

RELUCTANCE SYNCHRO/RESOLVER

BACKGROUND OF THE INVENTION

The present invention relates generally to synchro/resolver systems and deals more particularly with the production of resolver based signals directly from a synchro.

The use of direct drive motors in many servo applications, such as, for example, robotics has increased the need for highly accurate position sensors to provide information representative of the motor shaft position. Previously used sensors, such as Hall-effect sensors, encoders and tachometers provided accuracies of about 1° to 2°. Synchro/resolvers used as position sensors often do not have as high a resolution or accuracy as is often desired in direct drive digital servo positioning systems.

Resolvers generally, due to the limited number of poles, usually 20–30 poles, can provide accuracies of only about +/−30 arc minutes. Additionally, a resolver, because of the quadrature relationship of the stator windings, is constructed using stator and rotor parts that are generally different from a motor with which it is used. Consequently, there is often an additional cost associated with using resolvers having a differently configured stator and rotor from those of the motor.

Synchros can generally provide higher positional accuracies than resolvers and often are constructed using a stator and rotor having the same configuration as the drive motor with which it is used. The synchro however, unlike the resolver which has a signal amplitude at the stator output that varies according to the sine and cosine of the motor shaft angle, has a stator output signal that is 120° out of phase with the other stator output signals. Because resolver-to-digital converters operate from resolver-based signals, i.e. sine and cosine, the synchro stator outputs must be converted or transformed using a Scott-T transformer or electronic circuitry to provide the desired resolver sine-cosine signal relation.

Another drawback using known synchros as position sensors is the requirement of precision and generally expensive components which are necessary to sense the phase current flowing in each stator winding. A voltage drop is developed across a precision current-sensing resistor in series with the phase, and this voltage signal is amplified and converted as explained above or is inputted to a specially made synchro-to-digital converter module which produces a digital synchro position signal as its output. Generally, the magnitude of the voltage signal developed across the current-sensing resistor is very small and requires substantial amplification to be used.

It is a general object therefore of the present invention to provide a synchro position sensor that overcomes the disadvantages generally associated with known synchro position sensors.

It is a further object of the present invention to provide a synchro position sensor that produces resolver-based signals directly from its output, without requiring expensive precision current-sensing resistors or other conversion devices.

It is a yet further object of the present invention to provide a synchro position sensor that is generally less complex to construct, uses less complex circuit components and provides output signals having a relatively large magnitude.

SUMMARY OF THE INVENTION

In accordance with the present invention, resolver-based signals are produced directly from a variable reluctance synchro. The pole members associated with each of the three phases A, B and C are quadrifilarly wound with each of the pole members of a given phase having a winding associated with each of the four conductors of the quadrifilar winding. An alternating current source provides an excitation signal to a first conductor associated with a first winding on each of the pole members associated with phases A, B and C. The quadrifilar windings are connected in series aiding and series opposing arrangments to produce a 2B–2C voltage output representative of a resolver based $R/\cos\theta$ signal and other of the quadrifilar windings are connected in series aiding and series opposing arrangements to produce a 2A–B–C output signal representative of a resolver-based $R/\sin\theta$ output signal.

BRIEF DESCRIPTION OF THE DRAWINGS

Other features and advantages of the present invention will become readily apparent from the following description and claims taken in conjunction with the drawings wherein:

DETAILED DESCRIPTION OF THE PREFERRED EMBODIMENTS

Positional signals representative of a shaft position as sensed by a resolver are in the form of $R/\sin\theta$ and $R/\cos\theta$. Generally, a synchro/resolver is constructed similarly to a variable reluctance motor and has a stator and rotor substantially identical to the motor.

Figure 1:
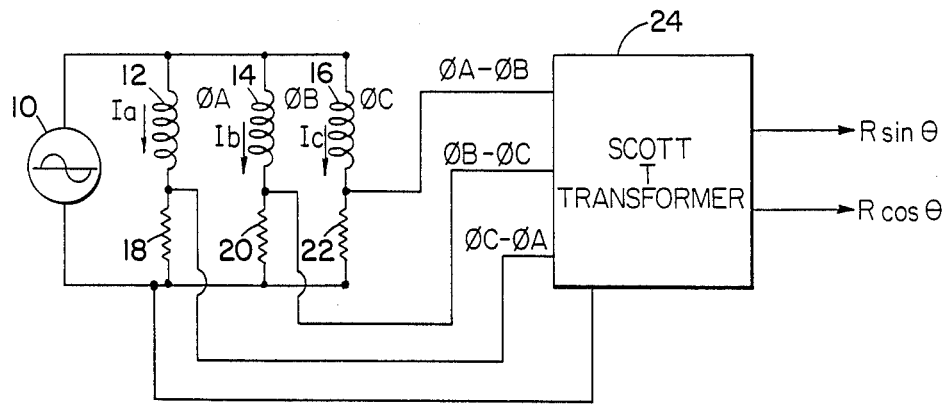
FIG. 1 is a schematic representation of a prior art phase current sensing circuit for converting a three-phase synchro output to resolver-based signals.

Referring to FIG. 1, windings 12, 14 and 16 are connected in phases A, B, and C and correspond to the phases of the windings of the motor. The synchro/resolver, instead of producing torque with a change of magnetic reluctance, as is the case in the motor, is supplied with an alternating current in the windings 12, 14, 16 from an alternating current source 10. As the rotor rotates, a change in the inductive reactance is indicated by the variation of the alternating current load. The alternating current develops a voltage drop across a current sensing resistor which is in series with each phase and current sensing resistors 18, 20 and 22 are shown in series with phases A, B and C, respectively in the schematic. The difference between the voltages developed acros the resistors provides the input phase voltages to a Scott-T transformer 24 which converts the three-phase input signals to the desired resolver-based signals in the normal manner.

The voltage developed across the current-sensing resistors 18, 20 and 22 can be represented by an amplitude modulated signal wherein the crest in the signal represents tooth misalignment and the trough represents tooth alignment. The expression for an amplitude modulated signal is generally well known to those skilled in the art and can be represented generally as $$K_c \sin W_c t (1+K_m \sin \theta)$$

Accordingly, each signal at the input to the Scott-T transformer is in the form of $$(K_c W_c t)(K_m \sin \theta)$$

wherein $$K_c \sin W_c t$$

represents the carrier signal, that is, the excitation signal provided by the alternating current source.

The voltage signal for phase A is represented by $$K_c \sin W_c t(1+K_m \sin \theta);$$

for phase B, the voltage is represented as $$K_c \sin W_c t(1+K_m \sin (\theta+120));$$

and, the voltage signal for phase C is expressed as $$K_c \sin W_c t(1+K_m \sin (\theta+240)).$$

The resolver-based signals are related to the synchro output signals by the following expressions:

$$\sin \theta = 2A-B-C, \text{ and}$$

$$\cos \theta = B-C$$

wherein A is the voltage signal of phase A, B is the voltage signal of phase B and C is the voltage signal of phase C.

Figure 2:
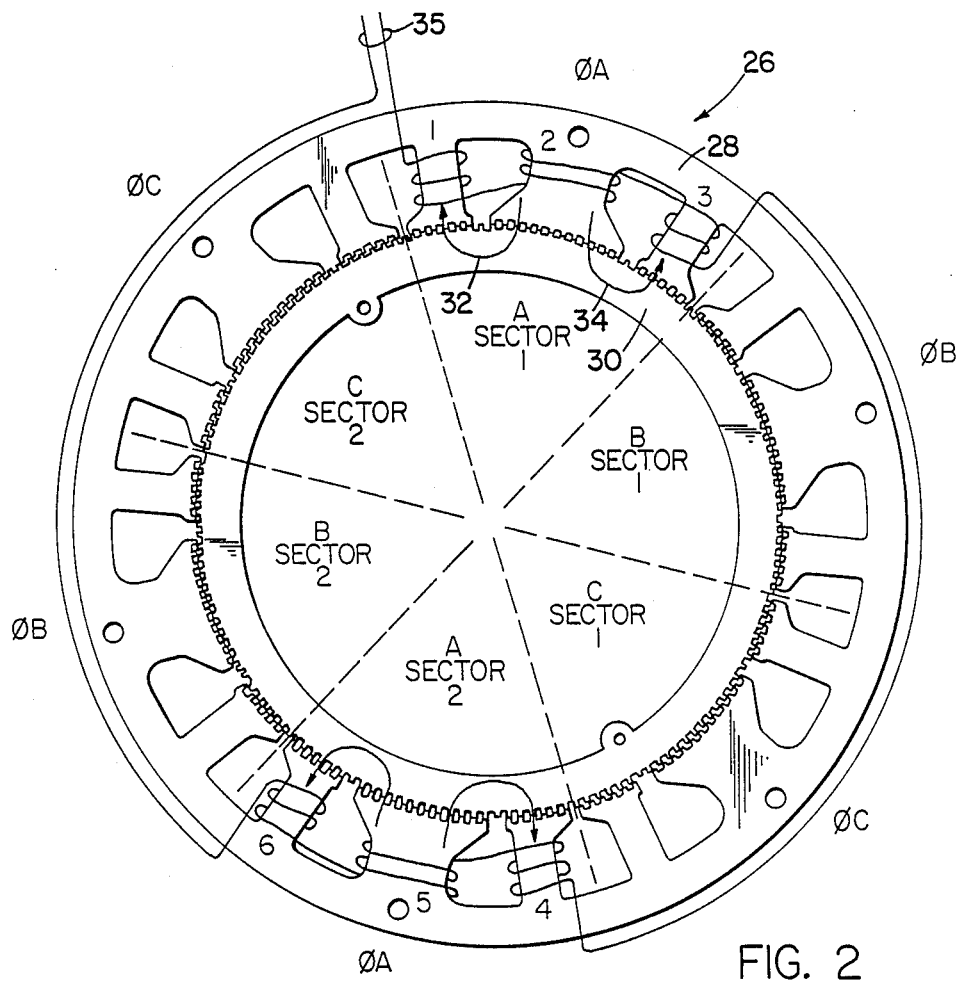
FIG. 2 is a schematic representation of the synchro/resolver embodying the present invention and illustrating the pole winding configuration for one phase in producing the resolver based signals directly from the synchro.

Turning now to FIG. 2, a synchro arranged to provide resolver-based signals directly from the synchro is illustrated and designated generally 26. The synchro 26 includes a stator assembly 28 which comprises a number of laminations stacked to form a stator assembly and includes a rotor 30 also constructed of a number of laminations. Each of the windings of a given phase, such as, for example, phase A, are wound around pole members 1, 3, 4 and 6 in a clockwise direction and around pole members 2 and 5 in a counterclockwise direction. Each of the remaining phased B and C are wound in a similar manner. The pole members associated with each phase are placed substantially opposite one another so that any errors due to mechanical misalignment, warpage, or other abnormalities are averaged out to improve accuracy. As illustrated in FIG. 2, flux flows in paths 32 and 34 when the rotor teeth are aligned with the stator teeth, which causes a higher inductance and consequently, a higher current to flow in the winding, thereby producing a higher voltage across the winding. As the teeth of the rotor become misaligned with the teeth of the stator pole as the rotor rotates the current drops and accordingly, the voltage developed across the winding also drops. Consequently, it can be seen that the voltage developed across a winding is related to the position of the rotor.

Figure 3:
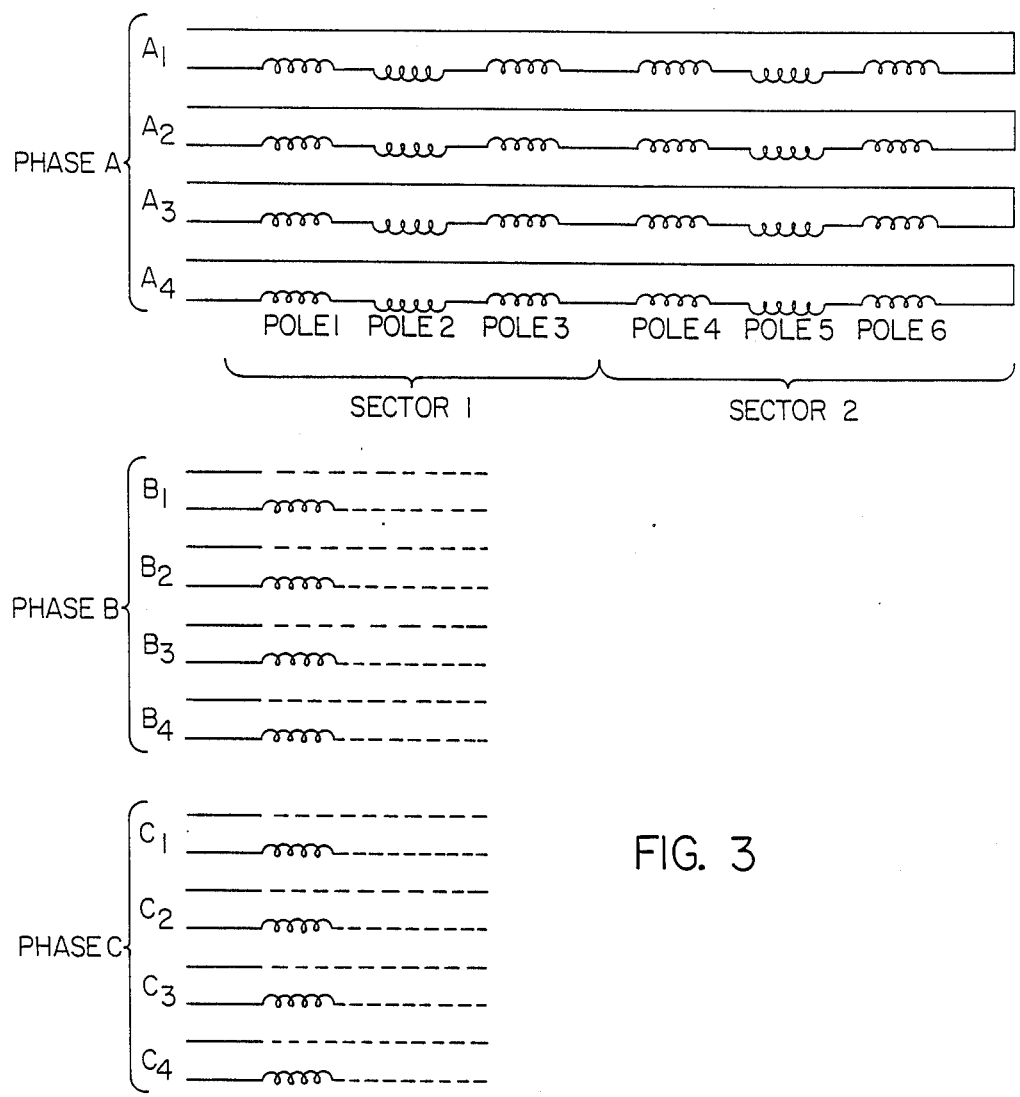
FIG. 3 is a schematic representation showing the quadrifilar winding arrangements for the three phases of the synchro.

Turning to FIG. 3, it is seen that the quadrifilar or four parallel conductors 35 are wound about each respective pole of its associated phase. For example, the conducter $A_1$ is wound about each of the poles associated with phase A. Similarly, conductors $A_2$, $A_3$ and $A_4$ are also wound around the pole members associated with phase A. Phases B and C are wound in a similar manner.

Figure 4:
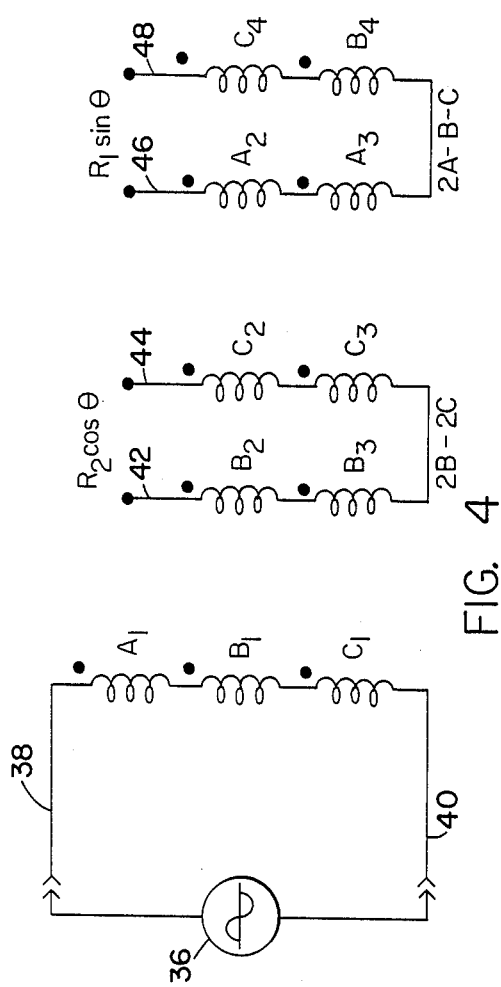
FIG. 4 is a schematic representation illustrating the inter connection arrangement of the quadrifilar windings to produce the resolver-based signals directly from the synchro.

Turning now to FIG. 4, the resolver-based output voltages, $R\sin\theta$ and $R\cos\theta$ are produced by connecting the windings of the synchro as illustrated. A source of alternating current 36 typically provides a six volt RMS signal at a frequency of 5 kilohertz. Conductors $A_1$, $B_1$ and $C_1$ are connected in series aiding fashion as illustrated, with one end 38 of the conductor $A_1$ being connected to one side of the source 36 and one end 40 of conducter $C_1$ being connected to the other side of the source. The $\cos\theta$ resolver-based term is produced by the series connection of conductors $B_2$, $B_3$, $C_2$ and $C_3$ in a phased relationship to produce an output signal 2B-2C across the output terminals 42,44. Since there are losses in the circuit, the output voltage signal across terminals 42 and 44 is expressed as $R_2\cos\theta$ wherein $R_2$ is representative of the modulation and carrier constants in the underlying formulas providing the basis for the invention.

The $\sin\theta$ resolver-based term is expressed as 2A-B-C and is produced by the connection of conductors $A_2$ and $A_3$ and phased as series aiding and conductors $B_4$ and $C_4$ connected to oppose the phase of $A_2$ and $A_3$. An output voltage signal is developed across the terminals 46 and 48 which is representative of the resolver based term $R_1\sin\theta$ wherein $R_1$ is a constant and is dependent on the modulation constants and the loss in the circuit.

In one working embodiment of the invention, each pole winding is wound with 25 turns of number 31 wire and produced an $R_2\cos\theta$ voltage signal across leads 42 and 44 of about 0.75 volts RMS and produced a voltage signal $R_1\sin\theta$ across leads 46 and 48 of about 0.9 volts RMS with a six volt RMS, 5 kilohertz alternating current source.

Figure 5:
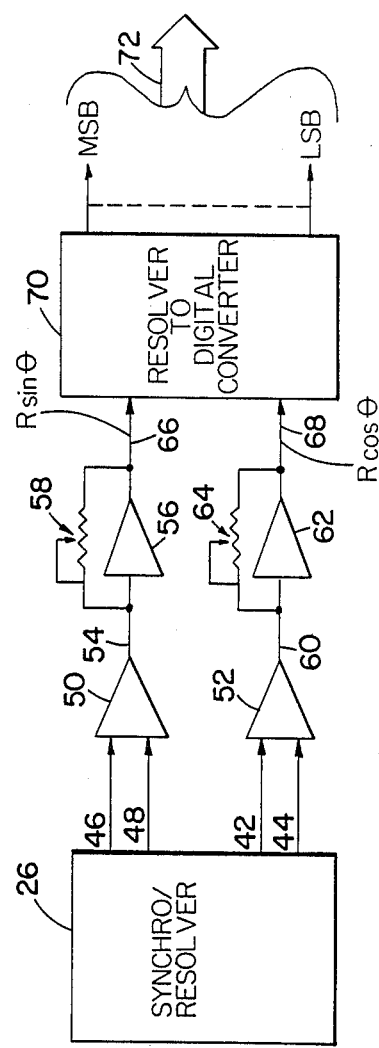
FIG. 5 is a schematic representation showing the resolver of the present invention connected to a resolver-to-digital converter module.

Turning now to FIG. 5, the synchro/resolver of the present invention is indicated by the box 26 and has its output leads 46, 48 across which the $R_1\sin\theta$ voltage is developed and inputted to a differential amplifier 50. The output across leads 42, 44 representative of the $R_2\cos\theta$ voltage signal is inputted to a differential amplifier 52. Since the output signals are not referenced to a ground or any common reference potential, the problem of common mode rejection is avoided and the circuit exhibits a high noise ammunity. The output 54 of amplifier 50 is fed to a operational amplifier 56 having a gain adjustment potentiometer 58. The output 60 of the amplifier 52 is fed to a operational amplifier 62 also having a gain adjustment potentiometer 64. The gain adjustment potentiometers 58 and 64 are adjusted so that the magnitude of the respective voltages at the inputs 66 and 68 to the resolver-to-digital converter module 70 are equal. That is, the magnitude of the $R\sin\theta$ signal on lead 66 is equal in magnitude to the Rcosθ signal on lead 68. The resolver-to-digital converter chip 70 is well known in the art and provides a digitally encoded word at its output bus 72.

A variable reluctance synchro/resolver has been described above. It will be understood that numerous substitutions and changes may be made without departing from the spirit and scope of the invention and therefore the invention is presented by way of illustration rather than limitation.

We claim:

1. A variable reluctance synchro/resolver comprising:

a stator assembly means having a plurality of first and second salient pole members, two of said second pole members being in spaced relation with and disposed at opposite sides of said first pole member, said one first and two second pole members being associated with one phase of each of three phases A, B and C and being arranged successively around the circumference of said stator assembly, the pole members associated with a given phase being disposed oppositely from pole members associated with the same phase;

a plurality of electrically energizable windings disposed one for one on each of said first and second pole members, each of said first and said second pole members associated with a given phase being quadrifilarly wound with said first pole members being wound in a direction opposite from said second pole members, each of said pole members of a given phase having a winding associated with each of the four conductors of said quadrifilar windings;

rotor means positioned adjacent said first and second pole members and movable with respect to them for changing the inductance of said quadrifilar windings as a function of the position of the rotor means relative to said first and second pole members;

an alternating current source for providing an excitation signal to a first conductor associated with a first winding on each of said pole members associated with each of said phases A, B and C, said respective first windings being connected in a series aiding arrangement;

a second conductor associated with a second winding on each of said pole members associated with phase B and a third conductor associated with a third winding on each of said pole members associated with phase B being connected in a series aiding arrangement and a second conductor associated with a second winding on each of said pole members associated with phase C and a third conductor associated with a third winding on each of said pole members associated with phase C being connected in a series aiding arrangement, one end of said B series aiding and said C series aiding arrangments being connected to produce a series opposing arrangement and producing an output voltage signal across the other ends of said B and C series arrangements having a magnitude equal to 2B-2C and representative of a resolver-based signal Rcosθ, and a second conductor associated with a second winding on each of said phase A pole members and a third conductor associated with a third winding on each of said phase B pole members being connected in a series aiding arrangement, and a fourth conductor associated with a fourth winding on each of said phase B pole members and a fourth conductor associated with a fourth winding on each of said phase C pole members being connected in a series aiding arrangement, one end of said A series aiding and said B, C series aiding arrangements being connected to produce a series opposing arrangement and producing an output voltage signal across the other ends of said A and said B, C series arrangements having a magnitude equal to 2A-B-C and representative of a resolver-based signal Rsinθ.

* * * * *